May 11, 1965      E. A. PRIJATEL      3,182,596

HYDRAULIC SYSTEMS AND PUMPS

Filed May 31, 1963      2 Sheets-Sheet 1

Inventor:
Edward A. Prijatel
By: Thomas B. Hunter
Atty.

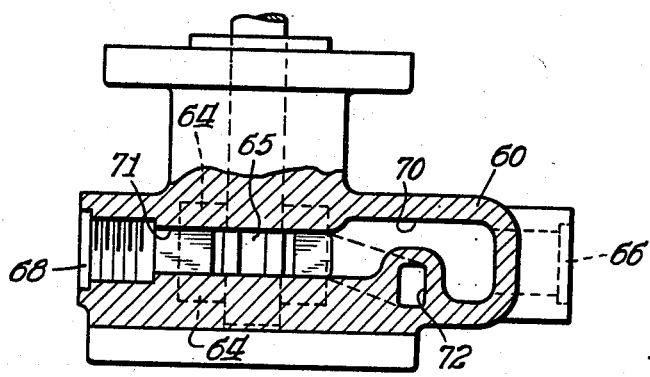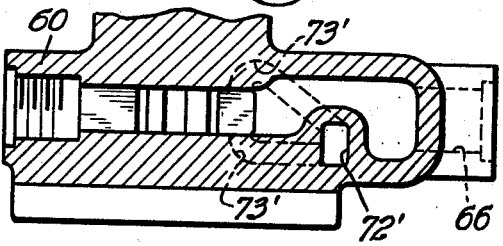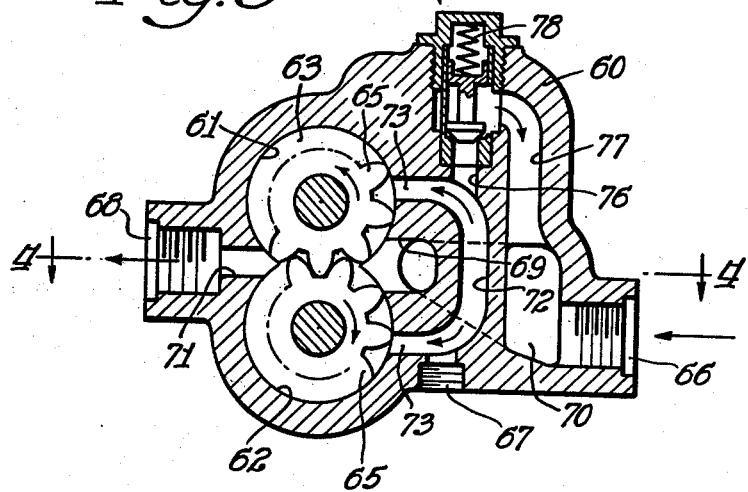

United States Patent Office 3,182,596
Patented May 11, 1965

3,182,596
HYDRAULIC SYSTEMS AND PUMPS
Edward A. Prijatel, Lyndhurst, Ohio, assignor to Borg-Warner Corporation, Chicago, Ill., a corporation of Illinois
Filed May 31, 1963, Ser. No. 284,554
13 Claims. (Cl. 103—2)

This invention relates generally to hydraulic systems and more particularly to fluid transfer systems including a positive displacement pump for pumping fluid from a source of supply to a utilization means.

Positive displacement pumps such as, intermeshing gear pumps and sliding vane pumps, for example, are susceptible to cavitation when bubbles are present in the fluid entering the pump inlet. This is particularly true when such pumps are used in systems such as aircraft fuel supply systems where the pumps must supply volatile fuel vented to the low atmospheric pressures existing at high altitudes.

The term "bubble," as used herein, may be defined as a gaseous and/or vaporous globule in the liquid being pumped and consists, for the most part, of vapor and air evolving from the fluid due to operation with high fluid temperatures, inlet line restrictions, high speeds, and low tank pressures. The size of these bubbles is not uniform and this causes erratic pump discharge pressure due to non-uniform and insufficient filling of the pockets or interspaces between the vanes or gear teeth, as the case may be, when they rotate past the conventional inlet port. For purposes of illustration, reference is made in the following description to some of the problems involved in designing reliable aircraft fuel systems and the like. It should be recognized, however, that fuel pumps used in these systems may be of several well-known types, but in order to simplify the exposition of the invention without sacrificing a full and complete disclosure thereof, it will be presumed that the hydraulic system referred to herein is an aircraft fuel system employing either a rotary intermeshing gear pump or a vane pump. It should also be understood that wherein reference is made to the gear teeth interspaces this also applies, unless expressly stated otherwise, to the spaces between the adjacent sliding vanes in a rotary sliding vane pump.

In an aircraft fuel pump system, fuel in the supply tanks is delivered by gravity or by means of a tank-mounted booster pump to the main fuel pump inlet. With the gravity system, or when the tank-mounted booster pump fails to provide a pressure rise, restrictions in the inlet line plumbing, between the tank and pump inlet, lower the inlet pressure to a value below tank pressure. Under these operating conditions, pumps are susceptible to cavitation due to the evolving of dissolved air, gas, and vapors from the fuel in the supply tank and in the reduced pressure areas of the inlet line, even though reduction in pressure is not necessarily below the vapor pressure of the fuel. This phenomenon is due to fluid characteristics of the fuel which has less ability to retain dissolved air, gas, and vapors at the lower pressures. The cavitation in this instance is caused by formation of bubbles adjacent the inlet port of the pump due to the accumulation of the evolved air, gas, and vapors referred to above. In actual practice, it has been found that the accumulation of bubbles at the pump inlet are not of uniform size. This results in incomplete and variable filling of the intertooth spaces of the pump and causes erratic pumping action at the pump discharge. In high performance aircraft installations, fuel pumps are required to operate at a vapor to liquid ratio of 0.45; or stated in another way, the inlet fluid is a mixture comprising 69% liquid and 31% bubbles. As 31% of the fluid mixture contains bubbles, it would be theoretically possible to fill only 69% of the gear teeth interspaces with the conventional inlet port.

It is therefore a principal object of the present invention to provide a fluid pumping system adapted to pump a fluid medium containing a high ratio of vapor to liquid without the need for the upstream boost pump and related boost drive gearing.

Another object of the invention is to provide a fluid pumping system including a positive displacement pump having auxiliary inlets supplied with fluid at a higher pressure than the main inlet to prevent formation of voids in the fluid.

Another object of the invention is to provide a fluid pumping system in accordance with the above objects which automatically supplies auxiliary intake fluid to the pump in response to the presence of voids in the pump inlet. Other and more particular objects and advantages will be apparent from the following detailed description taken in conjunction with the drawings in which:

FIGURE 3 is a cross-sectional view of a rotary intermeshing gear pump embodying the principles of the invention;

FIGURE 4 is a cross-sectional view taken along the plane of line 4—4 of FIGURE 3;

FIGURE 5 is a cross-sectional view similar to FIGURE 4 of a modified rotary intermeshing gear pump;

Figure 1:
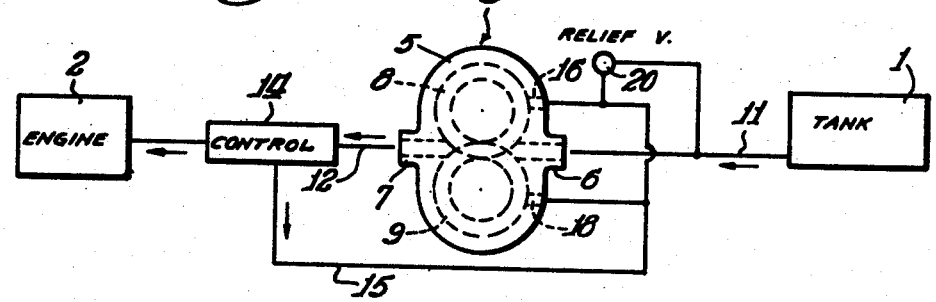
FIGURE 1 is a diagrammatic or schematic illustration of the principles of one form of the present invention.

Referring now to FIGURE 1, in which one form of the invention is shown in diagrammatic fashion, reference numeral 1 designates a source of fluid supply in the form of a tank or reservoir for fluid to be pumped, ultimately to a utilization means 2, such as an engine, or some device receiving fluid from the tank. In the example, the system is employed in an aircraft installation wherein volatile fuel is pumped from the fuel tanks to be sprayed by a fuel nozzle or the like into the combustion chambers of said engine. The pump 3, in the form of a rotary intermeshing gear pump of a type well-known in the art, comprises a casing 5 having a main inlet port 6, a discharge port 7, and impeller means in the form of intermeshing, rotary gear members 8 and 9 connected to any suitable source of rotary power (not shown). The fuel tank 1 is connected by the means of a conduit 11 to the inlet side of the rotary gear pump and the discharge side or outlet of said pump is connected by a conduit 12 to a control device 14 adapted to control the amount of fluid being delivered to the engine. Rather than control the speed of the rotary impellers, it is more practical in most applications to drive the pump impellers continuously at a constant speed and return the nonutilized fluid to pump inlet. By selectively bypassing a certain portion of the fluid discharge from the pump to inlet, any amount from 0–100% of the pump's volumetric capacity can be delivered to the engine.

The details of the control means form no part of the present invention and since this unit may be one of any well-known types, it is believed to be sufficient for the purpose of this application to describe it solely in terms of its function.

An important aspect of the present invention, as generally outlined in the objects, is to provide a fluid pumping system including a positive displacement pump having auxiliary inlets which are supplied with substantially bubble-free fluid at a pressure in excess of the pressure existing in the main pump inlet. Accordingly, the pump is provided with auxiliary inlets 16, 18, each said auxiliary inlet connecting with the pump chamber at a point circumferentially spaced in the direction of impeller rotation from the main inlet. To provide a seal between the auxiliary inlet ports and the main inlet port, the space therebetween is at a distance of at least one tooth space. Fluid from the bypass line 15, which is normally returned to the pump inlet, is delivered under pressure to the auxiliary inlets 16 and 18 to assist in displacing the bubbles which may be in the gear teeth interspaces. When the unit is pumping a fluid having a large ratio of bubbles to liquid, the higher pressure of the fluid at the auxiliary inlets displaces the bubbles in the fluid as the rotating gear impeller passes by each of said auxiliary inlets. In order to maintain a predetermined pressure differential between the main inlet 6 and the auxiliary inlets 16 and 18, a pressure relief valve 20 is incorporated in a fluid passage interconnecting the auxiliary inlets 16 and 18 to the main inlet 6. When a large proportion of the discharge fluid is being returned through the bypass line from discharge, the pressure builds up in the auxiliary lines quite rapidly so that fluid not needed to maintain the pressure in the auxiliary inlets is passed through the relief valve back to the main inlet. In practice, it has been found that a relief valve setting at one or two atmospheres above main inlet pressure is desirable, but it is theoretically possible to operate at other relief valve pressure settings.

Some internal leakage from discharge pressure areas to inlet pressure areas is unavoidable in gear pumps of this type. For example, leakage occurs between the sides of the gears and contiguous bearing faces and is normally vented to inlet pressure. This leakage, along with any other leakage normally vented to inlet pressure, can be employed to advantage by venting this fluid back to the auxiliary inlets where it can be utilized to aid filling of the gear tooth interspaces. This can be accomplished by suitable vent passages or grooves (not shown) in the bearings, the pumping chamber walls, and the impeller shafts.

Figure 2:
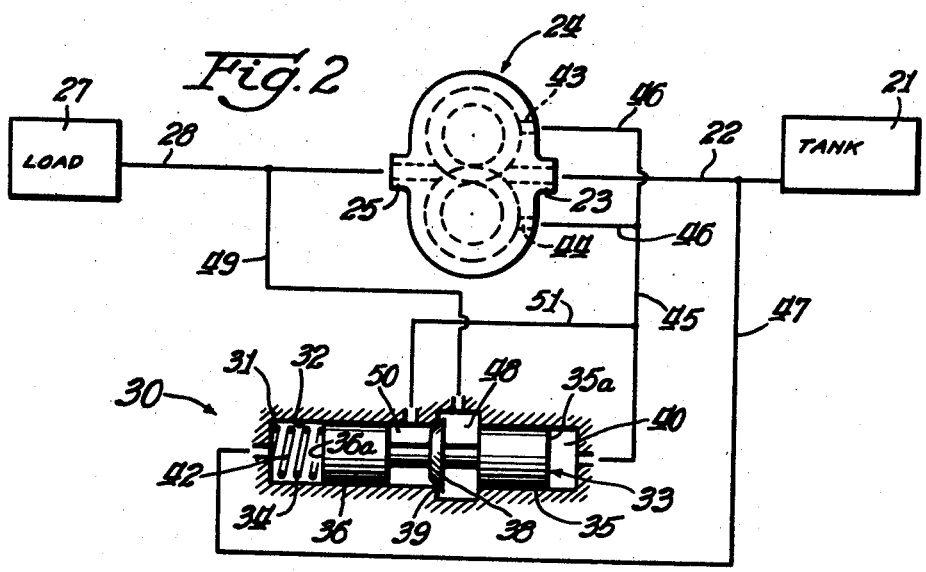
FIGURE 2 is a diagrammatic or schematic illustration of a modified form of the invention.

Another somewhat modified form of the invention, is illustrated schematically in FIGURE 2. In this embodiment, which is adapted to be used in a pumping system where the load or utilization means requries a substantially constant flow of fluid per unit time, an automatic bypass control valve constitutes an important feature of the combination. This control valve automatically bypasses the proper volume of fluid from pump discharge to the auxiliary inlet ports under operating conditions when bubbles in the inlet fluid cause insufficient filling of the gear teeth interspaces.

The pumping system shown in FIGURE 2 includes a supply tank or reservoir 21 connected by the conduit 22 to the main inlet 23 of gear pump 24. Pump discharge 25 is fluidly interconnected to the load or utilization means 27 by means of a conduit 28. The bypass control valve 30, referred to above, comprises a body member 31 having a cylindrical bore 32 extending therethrough and a slidable spool 33 received in said bore and biased to the right (as viewed in the drawing) by a compression spring 34. The spool includes terminal portions or pistons 35, 36 having opposed faces 35a, 36a respectively and a valve head 38 adapted to engage valve seat 39 in the body member. Spool faces 35a, 36a define, together with the bore 42, a pair of pressure chambers 40, 42 at opposite ends of the spool. Chamber 40 is fluidly interconnected with auxiliary inlet ports 43, 44 by way of conduit 45 which is joined to auxiliary inlet branch conduits 46, 46. Chamber 42 is fluidly interconnected with main inlet line 22 by means of a conduit 47 which joins line 22 upstream from the main pump inlet 23. The central portion of bore 32 is enlarged to provide a chamber 48 which is fluidly interconnected to discharge pressure by way of conduit 49; and the low pressure side 50 of the valve 38 communicates with auxiliary inlets by way of conduit 51. The diameter of the valve head is designed so that the pressure acting against the inside face of piston 35 is balanced by the pressure acting against the pressure side of the valve head 38.

The operation of the automatic control valve will be explained with reference to FIGURE 2. An increase in the ratio of bubbles to liquid in the inlet fluid is accompanied by a reduction in the pressure at the auxiliary inlets relative to inlet fluid pressure. Since the pressure at the auxiliary inlets is the same as the pressure in chamber 40, the reduced pressure in chamber 40 unbalances the valve spool causing the spring 34 to shift the spool to the right (as viewed in FIGURE 2), thereby opening the valve. Fluid at discharge pressure then flows from chamber 48 through the opened valve to chamber 50 and into conduit 51 to force the fluid through the auxiliary inlet lines 46, 46 into the gear teeth interspaces to displace the voids. When sufficient pressure builds up, the fluid acting against face 35a counteracts the spring force and closes the valve. As long as the pump is operating with bubble-free fluid, the valve remains closed and no fluid from discharge is returned to the inlet. However, as soon as the pressure drops in the auxiliary inlet lines relative to inlet pressure, the valve opens and pressurized fluid is injected into the gear teeth interspaces to displace the bubbles and correct the undesirable condition.

FIGURES 3 and 4 illustrate a gear pump which is adapted for use in the system shown in FIGURE 1 and, with a slight modification, is also adapted to be employed in the system shown in FIGURE 2. This pump comprises a casing 60 having a pair of intersecting cylindrical bores 61, 62 formed therein to provide a pumping chamber 63. Supported for rotation by suitable bearing means 64 (FIGURE 4) are a pair of intermeshing gear impellers 65 driven in the direction of the arrows (FIGURE 3) by any suitable source of rotary power (not shown).

The casing 60 is further provided with a main inlet connection 66, an auxiliary inlet connection 67, and a discharge connection 68. Main inlet connection 66 is fluidly interconnected with main inlet port 69 intersecting the pumping chamber in the zone of meshing through fluid passage means 70 formed in the pump casing. Discharge connection 68 is fluidly interconnected with discharge port 71 which intersects the pumping chamber in the zone of meshing opposite the inlet port 69. The auxiliary inlet connection 67 is fluidly interconnected with branch fluid passage means 72 leading to a pair of auxiliary inlet ports 73. The latter are spaced at least one gear tooth space away from the main inlet port 69 in the direction of impeller rotation. The spacing requirement is necessary to provide a seal, because the same interspace or pocket between two adjacent gear teeth may not communicate at the same instant with both the main inlet port and the auxiliary inlet ports. The higher fluid pressure on the auxiliary inlet ports would cause the liquid to flow directly back to the main inlet.

In accordance with the system shown in FIGURE 1, means are provided for maintaining a constant pressure differential between the auxiliary inlets and the main inlet. This means includes a pressure relief valve 75 between passage 76 communicating with branch passage 72, and passage 77 communicating with the main inlet passage 70. When the pressure differential between the auxiliary inlet port exceeds a predetermined value, valve 75 unseats itself to permit fluid in the auxiliary inlet passages to return to the main inlet through passages 76 and 77. Pressure relief valve 75 may be set to any predetermined value by adjustment of the compression on spring 78, loading the valve against the seat.

When the above-described pump is employed in the system shown in FIGURE 1, the control means for varying the supply to the engine is connected through a line to the pump discharge connection 68. The bypass line, corresponding to line 15 (FIGURE 1), would be provided leading from the control means back to the auxiliary inlet connection 67.

When the pump is to be used in the system shown in FIGURE 2, the discharge from the pump is connected to the utilization means and a bypass line is directly connected into the latter leading to chamber 48 of the control valve. The pump must be modified in one respect in that when the pump is used in the system of FIGURE 2, there is no necessity for a relief valve from the bypass line back to inlet. Accordingly, the passageway in which the relief valve is placed would be sealed. A line leading from the auxiliary inlet connection 67 would contain two branches, one leading to a line corresponding to conduit 51 in FIGURE 2, and the other leading to the chamber 40 in the control valve of FIGURE 2. A branch line leading from the main inlet conduit would be connected to the chamber 42 of the control valve.

FIGURE 5 shows a modified pump of the same type described above in which the auxiliary inlet ports 73', 73' interconnect with the pumping chambers from the sides thereof or normal to the plane of rotation of the impellers. Auxiliary inlet fluid thus enters the gear teeth interspaces non-radially from two directions to fill the same. The structural characteristics are substantially identical in the pumps shown in FIGURES 3 and 4, the only difference being in the design of the auxiliary inlet passages. As shown in FIGURES 5, the upper and lower branches of the auxiliary fluid passage each communicate with fluid passages leading to opposite sides of the respective pump chambers.

Figure 6:
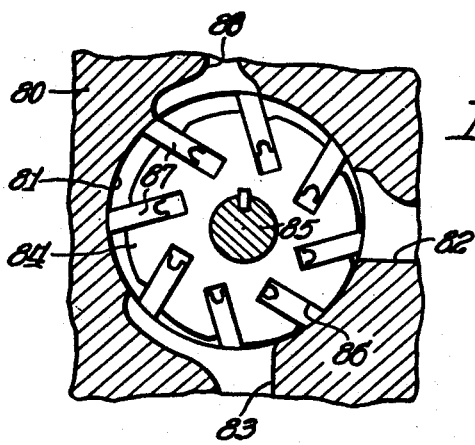
FIGURE 6 is a partial cross-sectional view of a rotary sliding vane pump embodying the principles of the invention.

FIGURE 6 is a partial cross-sectional view showing a conventional rotary, sliding vane pump modified in accordance with the present invention so as to be adapted for use in the systems of FIGURES 1 and 2. In the example, this pump comprises a casing 80 having a cylindrical pumping chamber 81 formed thereon, a main inlet 82, and a discharge 83. Received within the pumping chamber is a rotor 84 positioned eccentrically with respect to the axis of the pumping chamber 81. The rotor is keyed to a driving shaft 85 and driven by any suitable source of rotary power. The rotor is provided with plurality of slidable vanes 87 received within slots 86 provided circumferentially around the periphery of the rotor. As the rotor is driven, the vanes follow the contour of the inside surface of the pumping chamber, picking up fluid at the inlet and carrying it around toward the discharge port.

In accordance with the present invention, an auxiliary inlet port 88 is provided, said auxiliary port communicating with the pumping chamber at a point circumferentially spaced in the direction of the rotor rotation from the main inlet port. From the description given above with respect to the systems of FIGURES 1 and 2 as applied to the gear pumps, the manner of connection into said systems will be obvious to those skilled in the art.

The auxiliary inlet port 88 must be spaced from the main inlet port 82 at least an arcuate distance between two adjacent vanes 87 to provide the sealing arrangement described above in connection with the gear pump. Moreover, if the sliding vane pump is substituted for the gear pump in the system shown in FIGURE 1, it will incorporate a relief valve either internally or externally of the casing, similar to the valve 75, for venting auxiliary inlet fluid to the main inlet when the pressure differential exceeds a predetermined value.

It should be understood that while the invention has been described in connection with certain specific embodiments thereof, that this is by way of illustration and not by way of limitation and that the scope of the invention is defined solely by the appended claims which should be construed as broadly as is consistent with the prior art.

I claim:

1. A hydraulic system comprising:
   a positive displacement pump having main fluid inlet means and fluid discharge means;
   auxiliary fluid inlet means in said pump;
   fluid passage means interconnecting said discharge means and said auxiliary inlet means; and
   means for maintaining the fluid pressure in said auxiliary inlet means above the fluid pressure in said main inlet means.

2. A system as defined in claim 1 wherein said means for maintaining the fluid pressure in said auxiliary inlet means above the fluid pressure in said main inlet means comprises
   a fluid passage means interconnecting said auxiliary inlet means and said main inlet means; and
   a pressure relief valve in said last named fluid passage means.

3. A hydraulic system comprising:
   a positive displacement pump having main fluid inlet means and fluid discharge means;
   auxiliary fluid inlet means in said pump;
   fluid passage means interconnecting said discharge means and said auxiliary inlet means;
   control means for varying the flow of fluid from said discharge means to said auxiliary inlet means; and
   means for maintaining fluid pressure in said auxiliary inlet means above the fluid pressure in said main inlet means.

4. A hydraulic system comprising:
   a positive displacement pump having main fluid inlet means and fluid discharge means;
   auxiliary fluid inlet means in said pump;
   means responsive to the pressure differential between said main inlet means and said auxiliary inlet means for supplying fluid at discharge pressure to said auxiliary inlet means when said pressure differential drops below a predetermined minimum value.

5. A hydraulic system comprising:
   a positive displacement pump having a pumping chamber, main fluid inlet means connected to a fluid reservoir and fluid discharge means connected to a load;
   auxiliary fluid inlet means in said pump adapted to conduct fluid into said pumping chamber downstream from said main inlet means in the direction of flow within said pumping chamber; and
   control means for selectively bypassing a portion of the fluid flow from said discharge means to said auxiliary inlet means in response to the pressure differential between said main inlet means and said auxiliary inlet means.

6. A system as defined in claim 5 wherein said control means for selectively bypassing a portion of the fluid flow from said discharge means to said auxiliary inlet means in response to the pressure differential between said main inlet means and said auxiliary inlet means includes a valve comprising:
   a body member having a bore extending therethrough;
   a valve spool slidable within said bore having terminal portions defining a pair of pressure chambers with said bore and a valve member seating against a portion of said body member;
   means defining a first port communicating with said bore on one side of said valve member;
   means defining a second port communicating with said bore on the other side of said valve member;
   a compression spring resiliently urging said spool in a direction to open said valve and fluidly interconnect said ports;
   fluid passage means interconnecting one of said pressure chambers to said auxiliary inlet means;
   fluid passage means interconnecting the other of said pressure chambers to said main inlet means;
   fluid passage means interconnecting said first port to said auxiliary inlet means; and fluid passage means interconnecting said second port to said discharge means whereby said spring biases said valve to an open position permitting fluid at discharge pressure to flow through said valve into said auxiliary inlet means when the pressure differential between said main inlet means and said auxiliary means drop below a predetermined value.

7. A rotary sliding vane pump comprising:
a casing having a cylindrical cavity forming a pumping chamber therein;
a rotor arranged eccentrically with respect to said pumping chamber and having a series of generally radial slots formed around the circumference thereof;
a plurality of slidable vane members received within said slots and adapted to follow the contour of said pumping chamber and carry fluid within said pumping chamber in the direction of rotation of said rotor;
means defining an inlet port in said casing;
means defining a discharge port in said casing;
auxiliary inlet means spaced at least the distance between two adjacent vane members from said main inlet port in the direction of rotation of said rotor;
fluid passage means interconnecting said auxiliary inlet means with said inlet port; and
pressure relief valve means in said fluid passage means for permitting flow of fluid from said auxiliary inlet means to said inlet port when the pressure defferential therebetween exceeds a predetermined value.

8. A fluid pump comprising:
a casing having a pumping cavity formed therein, and having a main inlet passage and a discharge passage communicating with said cavity;
rotary fluid impelling means disposed in said cavity for creating a pressure differential between said main inlet passage and said discharge passage;
means defining an auxiliary inlet passage communicating with said pumping cavity at a point intermediate said main inlet passage and said discharge passage in the direction of fluid flow;
means defining a fluid bypass connection between said auxiliary inlet passage and said main inlet passage; and
valve means in said fluid bypass connection to bypass fluid from said auxiliary inlet passage to said main inlet passage in response to a predetermined pressure differential therebetween.

9. A hydraulic system comprising:
a pump including a casing having a pumping cavity formed therein, and having a main inlet passage and a discharge passage communicating with said cavity;
rotary fluid impelling means disposed in said cavity for creating a pressure differential between said main inlet passage and said discharge passage;
means defining an auxiliary inlet passage communicating with said pumping cavity at a point intermediate said main inlet passage and said discharge passage in the direction of fluid flow;
means defining a fluid bypass connection between said auxiliary inlet passage and said main inlet passage;
valve means in said fluid bypass connection to bypass fluid from said auxiliary inlet passage to said main inlet passage in response to a predetermined pressure differential therebetween; and
fluid passage means interconnecting said discharge passage and said auxiliary inlet passage.

10. A hydraulic system comprising:
a pump including a casing having a pumping cavity formed therein, and having main inlet passage and a discharge passage communicating with said cavity;
rotary fluid impelling means disposed in said cavity for creating a pressure differential between said main inlet passage and said discharge passage;
means defining an auxiliary inlet passage communicating with said pumping cavity at a point intermediate said main inlet passage and said discharge passage in the direction of fluid flow;
fluid passage means interconnecting said discharge passage and said auxiliary inlet passage; and
control means responsive to the pressure differential between said main inlet passage and said auxiliary inlet passage for bypassing fluid from said discharge passage to said auxiliary inlet passage.

11. A gear pump comprising:
a casing having a pair of intersecting bores therein;
a pair of rotary intermeshing gear members rotatably supported within said bores and forming pumping chambers therein;
main fluid inlet means intersecting said pumping chambers;
fluid discharge means intersecting said pumping chambers;
auxiliary inlet means intersecting at least one of said pumping chambers circumferentially spaced in the direction of gear rotation at least one gear tooth space away from said fluid inlet means;
the fluid passage means fluidly interconnecting said main inlet and said auxiliary inlets; and
valve means in said fluid passage means for maintaining a predetermined pressure differential between said auxiliary inlet means and said main inlet means, said valve opening at a predetermined pressure differential to permit flow from said auxiliary inlet to said main inlet means.

12. A gear pump as defined in claim 11 wherein said auxiliary inlet means intersect the pumping chamber substantially radially with respect to said rotatable gears.

13. A gear pump as defined in claim 11 wherein said auxiliary inlet means intersects said pumping chamber at the sides thereof substantially perpendicular to the plane of gear rotation.

References Cited by the Examiner
UNITED STATES PATENTS

| | | | |
|---|---|---|---|
| 1,844,103 | 2/32 | Retsema | 103—42 X |
| 2,301,496 | 11/42 | Aldrich | 103—42 X |
| 3,056,259 | 10/62 | Jubb et al. | 60—39.28 |
| 3,068,795 | 12/62 | Lauck | 103—42 X |
| 3,080,819 | 3/63 | Mayes | 103—2 X |

LAURENCE V. EFNER, *Primary Examiner.*